(12) United States Patent
Zhang et al.

(10) Patent No.: US 11,379,361 B2
(45) Date of Patent: Jul. 5, 2022

(54) FLUSH METHOD FOR MAPPING TABLE OF SSD

(71) Applicant: Yangtze Memory Technologies Co., Ltd., Wuhan (CN)

(72) Inventors: Lei Zhang, Wuhan (CN); Keke Ding, Wuhan (CN); Li Wei Wang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 16/929,054

(22) Filed: Jul. 14, 2020

(65) Prior Publication Data

US 2021/0365368 A1    Nov. 25, 2021

Related U.S. Application Data

(63) Continuation of application No. PCT/CN2020/091895, filed on May 22, 2020.

(51) Int. Cl.
*G06F 12/00*   (2006.01)
*G06F 12/02*   (2006.01)
*G06F 9/30*    (2018.01)
*G06F 11/30*   (2006.01)

(52) U.S. Cl.
CPC ...... *G06F 12/0292* (2013.01); *G06F 9/30047* (2013.01); *G06F 11/3037* (2013.01); *G06F 12/0246* (2013.01); *G06F 2212/214* (2013.01)

(58) Field of Classification Search
CPC ........................................ G06F 12/0223–0292
See application file for complete search history.

(56) References Cited

U.S. PATENT DOCUMENTS

| 2014/0244917 | A1  | 8/2014 | Maheshwari |            |
|--------------|-----|--------|------------|------------|
| 2016/0283136 | A1* | 9/2016 | Oe         | G06F 3/0653 |
| 2017/0017570 | A1  | 1/2017 | Yeh        |            |
| 2017/0083436 | A1  | 3/2017 | Jung       |            |
| 2019/0188124 | A1* | 6/2019 | Ferrante   | G06F 12/0246 |
| 2020/0151108 | A1  | 5/2020 | Yen        |            |

FOREIGN PATENT DOCUMENTS

| CN | 105677236 A | 6/2016 |
| CN | 106775436 A | 5/2017 |
| CN | 110275678 A | 9/2019 |
| CN | 110895448 A | 3/2020 |
| TW | 201729195 A | 8/2017 |
| TW | 201907311 A | 2/2019 |

\* cited by examiner

*Primary Examiner* — Daniel D Tsui
(74) *Attorney, Agent, or Firm* — Winston Hsu

(57) ABSTRACT

A flush method of a solid-state drive (SSD) comprises mapping a group of data to multiple segments of a mapping table; generating a recording table for recording a total value and multiple count values corresponding to the multiple segments; when one of the data is written, increasing one of the multiple count values corresponding to one of the multiple segments of the one of the data by a number, and increasing the total value by another number; determining whether the one of the multiple count values is greater than one of multiple optimized thresholds corresponding to the one of the multiple count values; and executing a flush operation to write the one of the multiple segments into a memory and restoring the mapping table if the one of the multiple count values is greater than the one of the multiple optimized thresholds.

8 Claims, 4 Drawing Sheets

| Seg 6 | Seg 0 | Seg 0 | Seg 0 | Seg 0 |
|---|---|---|---|---|
| Seg 0 | Seg 11 | Seg 0 | Seg 0 | Seg 15 |
| Seg 1 | Seg 1 | Seg 0 | Seg 19 | Seg 1 |
| Seg 0 | Seg 2 | Seg 1 | Seg 9 | Seg 1 |
| Seg 0 | Seg 0 | Seg 7 | Seg 0 | Seg 0 |
| Seg 3 | Seg 0 | Seg 10 | Seg 0 | Seg 0 |
| Seg 0 | Seg 0 | Seg 0 | Seg 1 | Seg 8 |
| Seg 0 | Seg 0 | Seg 1 | Seg 14 | Seg 2 |
| Seg 12 | Seg 0 | Seg 13 | Seg 1 | Seg 1 |
| Seg 2 | Seg 0 | Seg 2 | Seg 0 | Seg 0 |

FIG. 1

FLUSH METHOD FOR MAPPING TABLE OF SSD

CROSS REFERENCE TO RELATED APPLICATIONS

This is a continuation application of International Application No. PCT/CN2020/091895 filed on May 22, 2020, which are incorporated herein by reference in its entirety.

BACKGROUND OF THE INVENTION

1. Field of the Invention

The present invention relates to a flush method for a mapping table of a solid-state drive (SSD), and more particularly, to a flush method capable of reducing the unnecessary segment flush operation and the restoring time for the mapping table of the SSD.

2. Description of the Prior Art

In a solid-state drive (SSD), a mapping table, which is used to map multiple logical block addresses (LBAs) of a host to multiple physical addresses of a NAND flash respectively, needs to be accurately maintained. The mapping table is normally a one-level mapping table, and requires a quite large DRAM buffer to store mapping entries of every logical index. When an SSD firmware of the SSD is powered on, the large mapping table should be restored from the NAND flash to the DRAM buffer for a next coming address mapping. In order to reduce the restoring time, a management module of the SSD would cut the mapping table into multiple segments and generate multiple count values corresponding to the multiple segments. When one of the LBAs is updated by the host, one of the multiple count values corresponding to the one of the LBAs would be increased by 1. Then, if the one of the multiple count values reaches a threshold, the SSD firmware would trigger a flush operation to write one of the multiple segments corresponding to the one of the LBAs into the NAND flash. Therefore, the SSD firmware may restore the whole mapping table by reading these updated segments from the NAND flash and then patching the newly updates.

However, in an enterprise SSD firmware, there are hot and cold data. According to JEDEC JESD219, an enterprise endurance workload defines that 50% host accesses are within 5% user LBA range. The traditional enterprise SSD firmware may not consider affection resulted from the hot and cold data. As long as the count values reach the threshold, the SSD firmware would trigger the flush operation. The segments of the hot data would flush to the NAND flash more frequently than the segments of the cold data. Please refer to FIG. 1, which is a schematic diagram of a mapping table of an SSD in the prior art. Suppose there are totally 20000 LBAs, the first 5% LBAs are the hottest data and the whole mapping table is divided into 20 segments, denoted as Seg0~Seg19. A possible flush segment distribution in NAND flash under the JEDEC JESD219 workload may be similar to FIG. 1. As shown in FIG. 1, most of the segments written in the NAND flash are the hot segments, such as Seg0 and Seg1. Other cold segments are rarely written by the SSD firmware. In this way, there are two major problems: wasting written bandwidth of the NAND flash and causing unnecessary write amplification factor (WAF) of the NAND flash. Because the hot segments are written frequently, the written bandwidth is occupied by the hot segments. Although the hot segments are written a lot of times, only last written segments are used to restore the mapping table by the SSD firmware. Therefore, the flush operation of the previous hot segments would cause unnecessary WAF accordingly.

Thus, it is necessary to improve the prior art.

SUMMARY OF THE INVENTION

It is therefore an objective of the present invention to provide a flush method which is capable of reducing unnecessary segment flush operation and mitigating written bandwidth and WAF problem.

An embodiment of the present invention discloses a flush method of a solid-state drive (SSD). The flush method comprises mapping a group of data to multiple segments of a mapping table; generating a recording table for recording a total value and multiple count values corresponding to the multiple segments; when one of the data is written, increasing one of the multiple count values corresponding to one of the multiple segments of the one of the data by a number, and increasing the total value by another number; determining whether the one of the multiple count values is greater than one of multiple optimized thresholds corresponding to the one of the multiple count values; and executing a flush operation to write the one of the multiple segments into a memory and restoring the mapping table if the one of the multiple count values is greater than the one of the multiple optimized thresholds.

Another embodiment of the present invention discloses a solid-state drive (SSD) comprising a memory comprising a mapping table, and a control circuit configured to execute a flush process, wherein the flush process comprises mapping a group of data to multiple segments of the mapping table; generating a recording table for recording a total value and multiple count values corresponding to the multiple segments; when one of the data is written, increasing one of the multiple count values corresponding to one of the multiple segments of the one of the data by a number, and increasing the total value by another number; determining whether the one of the multiple count values is greater than one of multiple optimized thresholds corresponding to the one of the multiple count values; and executing a flush operation to write the one of the multiple segments into the memory and restoring the mapping table if the one of the multiple count values is greater than the one of the multiple optimized thresholds.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic diagram of a mapping table of an SSD in the prior art.

DETAILED DESCRIPTION

Figure 2:
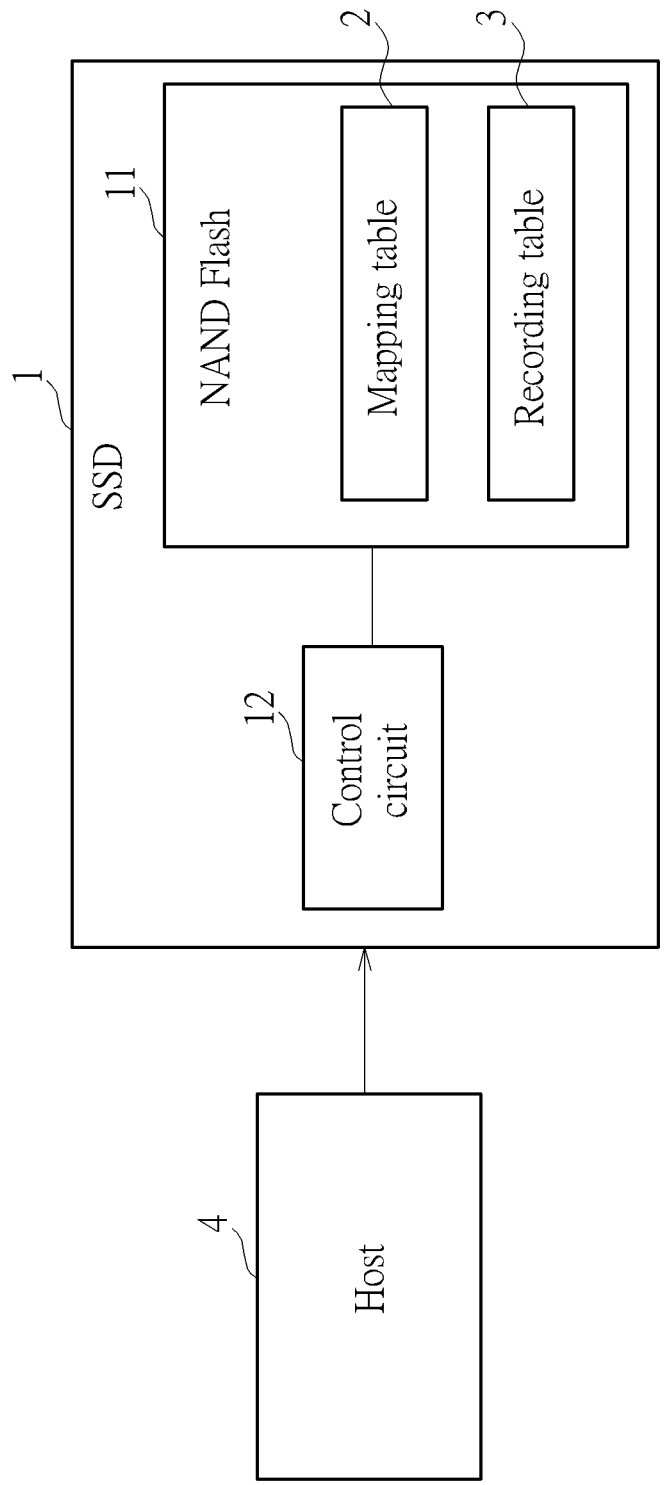
FIG. 2 is a schematic diagram of an SSD according to an embodiment of the present invention.

Please refer to FIG. 2, which is a schematic diagram of an SSD 1 according to an embodiment of the present invention.

The SSD 1 is coupled to a host 4 and comprises a NAND flash 11 and a control circuit 12. The NAND flash 11 stores a mapping table 2 and a recording table 3. The mapping table 2 comprises multiple segments Seg0 to Seg19; in other words, the mapping table 2 is divided into the multiple segments Seg0 to Seg19. The SSD 1 maps a group of data, e.g. multiple logical block addresses (LBAs), of the host 4 to the multiple segments Seg0 to Seg19. The recording table 3 records a total value and multiple count values corresponding to the multiple segments Seg0 to Seg19. The control circuit 12 is coupled to the NAND flash 1 and acquires the recording table 3 from the NAND flash 11 after the SSD 1 is powered on.

Figure 3:
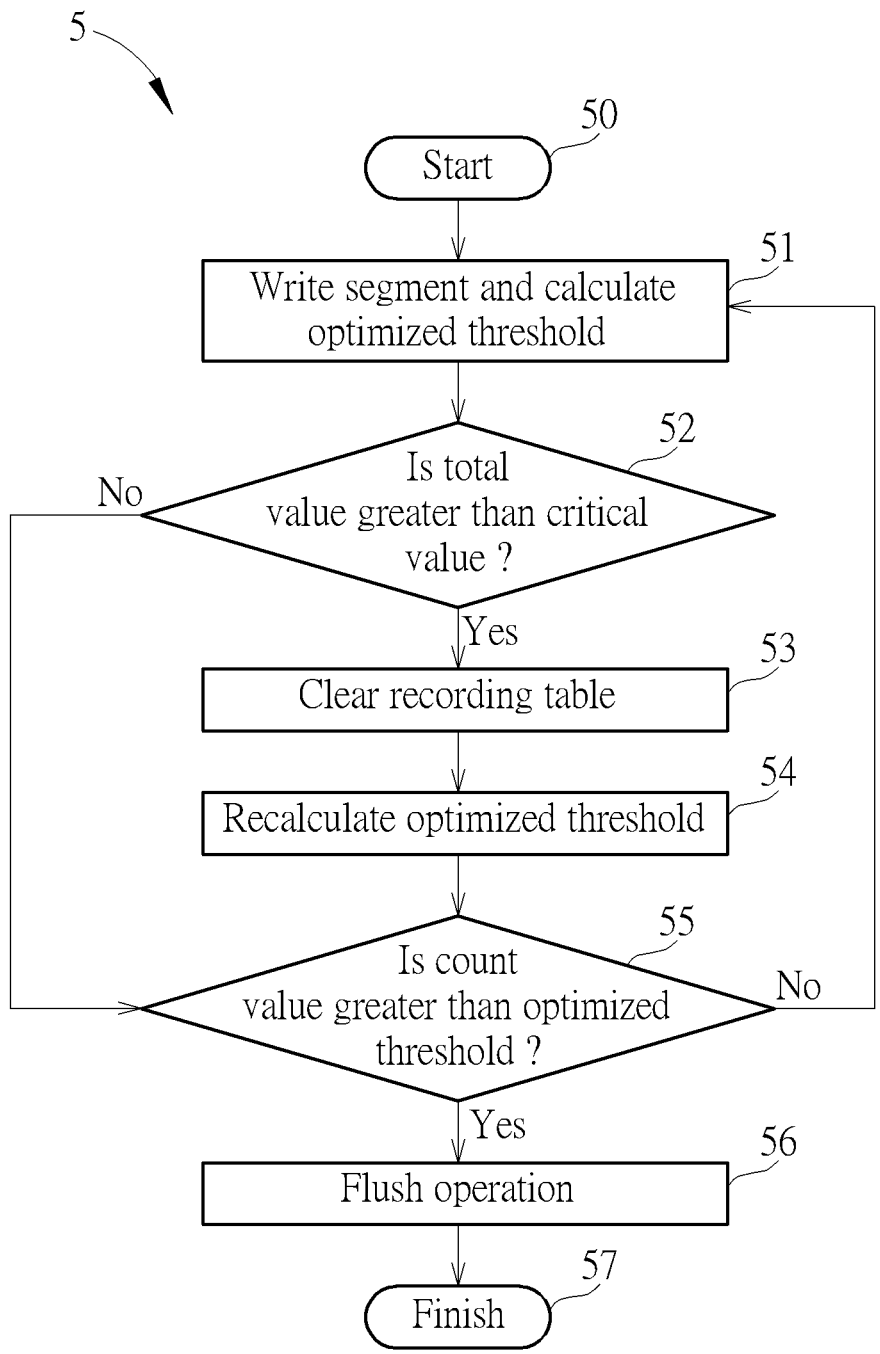
FIG. 3 is a flowchart of a flush process according to an embodiment of the present invention.

To flush the mapping table 2, the control circuit 12 is configured to execute a flush operation, which may be summarized as a flush process 5, as shown in FIG. 3. The flush process 5 comprises the following steps.

Step 50: Start.

Step 51: When one of the data (LBAs) is written by the host 4, increasing one of the multiple count values corresponding to one of the multiple segments of the one of the data by 1, increasing the total value by 1, and calculating one of multiple optimized thresholds corresponding to the one of the multiple count values.

Step 52: Determining whether the total value is greater than a critical value. If yes, go to step 53; else, go to step 55.

Step 53: Cleaning the recording table 3 and allowing the multiple count values, the total value and the multiple optimized thresholds to go to zero.

Step 54: Recalculating the one of the multiple optimized thresholds corresponding to the one of the multiple count values.

Step 55: Determining whether the one of the multiple count values is greater than the one of multiple optimized thresholds corresponding to the one of the multiple count values. If yes, go to step 56; else, go to step 51.

Step 56: Executing a flush operation to write the one of the multiple segments into the NAND flash 11 and restoring the mapping table 2.

Step 57: Finish.

In step 51, any one of the multiple optimized thresholds is determined by an equation of:

$$O = \frac{B}{\left(1 - \frac{C}{T}\right)} = \frac{B \times T}{(T - C)}$$

where O is defined as one of the multiple optimized thresholds, B is defined as one of multiple base thresholds corresponding to the multiple segments, C is defined as one of the multiple count values, and T is defined as the total value.

Therefore, as known from step 55 and step 56, if the optimized threshold O is greater, the flush frequency of the segments written into the NAND flash 11 is smaller. It may be seen from the equation that when the count value C is greater, the optimized threshold O is also greater, so the flush frequency of the segments would be smaller. That is, the flush frequency of the multiple segments Seg0 to Seg19 is inversely proportional to the count values C.

Figure 4:
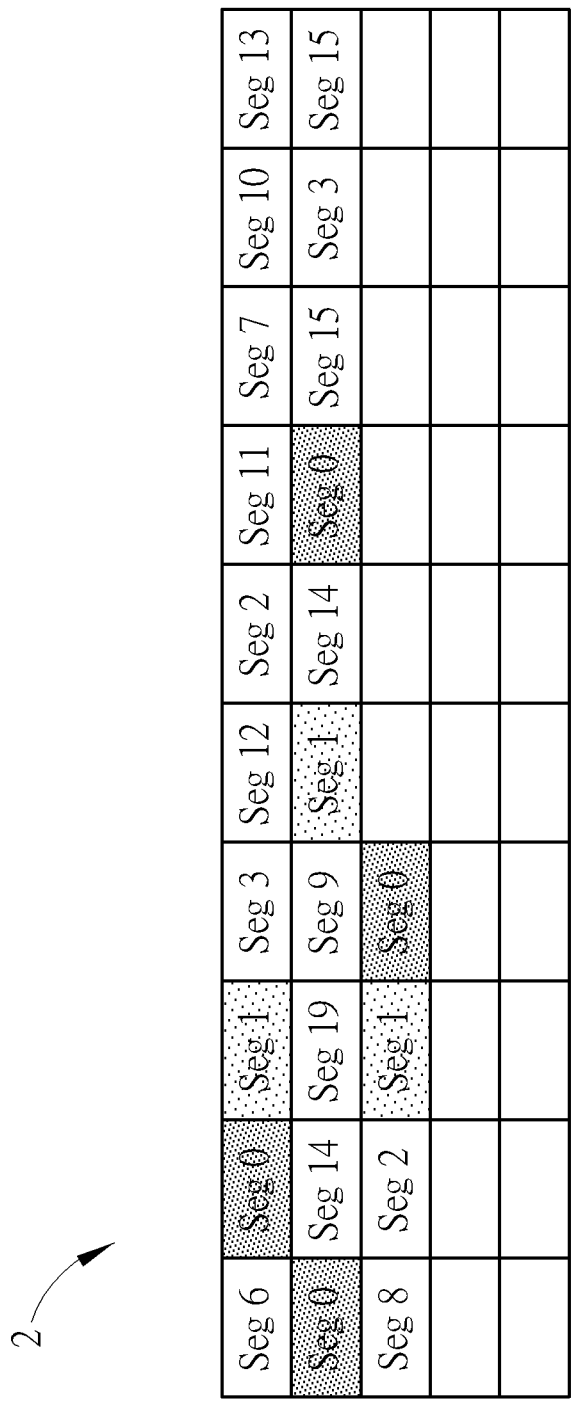
FIG. 4 is a schematic diagram of a mapping table of an SSD according to an embodiment of the present invention.

In this way, the SSD 1 may let hot segments, e.g. Seg0 and Seg1, to be flushed less frequently, but let cold segments to be flushed more frequently. For example, please refer to FIG. 4, which is a schematic diagram of a mapping table for an SSD according to an embodiment of the present invention. The mapping table 2 only comprises 4 segments Seg0 and 3 segments Seg1 that are the hot segments. In comparison to FIG. 1, where the mapping table of the traditional SSD comprises 25 segments Seg0 and 9 segments Seg1 that are the hot segments, the SSD 1 of the embodiment may be capable of reducing unnecessary segment flush operation and the restoring time.

It is worth noting that because the cold segments are flushed more often, the SSD 1 may reduce the possibility of losing data due to not updating the cold segments for a long time.

In step 52 and step 53, the SSD 1 may change inherent application mode due to different life cycles, different workloads and different writing scenarios, so the flush frequency of the segments Seg0 to Seg19 recorded and accumulated before may not reflect current utilization scenarios and habits. Therefore, when the total value reaches the critical value, e.g. a range of capacity of the NAND flash 11, the control circuit 12 cleans the recording table 3, which allows the multiple count values, the total value and the multiple optimized thresholds to go to zero.

In summary, the present invention provides an SSD and a flush method capable of reducing the unnecessary segment flush operation and the restoring time, and mitigating the written bandwidth and the WAF problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flush method for a solid-state drive (SSD), comprising:
    mapping a group of data to multiple segments of a mapping table;
    generating a recording table for recording a total value and multiple count values corresponding to the multiple segments;
    when one of the data is written, increasing one of the multiple count values corresponding to one of the multiple segments of the one of the data by a number, and increasing the total value by another number;
    determining whether the one of the multiple count values is greater than one of multiple optimized thresholds corresponding to the one of the multiple count values;
    executing a flush operation to write the one of the multiple segments into a memory and restoring the mapping table if the one of the multiple count values is greater than the one of the multiple optimized thresholds; and
    cleaning the recording table when the total value reaches a critical value, which allows the multiple count values, the total value and the multiple optimized thresholds to go to zero.

2. The flush method of claim 1, further comprising storing the recording table in the memory.

3. The flush method of claim 1, wherein one of the multiple optimized thresholds is determined by an equation of:

$$O = \frac{B}{\left(1 - \frac{C}{T}\right)} = \frac{B \times T}{(T - C)}$$

where O is defined as one of the multiple optimized thresholds, B is defined as one of multiple base thresholds corresponding to the multiple segments, C is defined as one of the multiple count values, and T is defined as the total value.

4. The flush method of claim 1, further comprising acquiring the recording table from the memory after the SSD is powered on.

5. A solid-state drive (SSD) comprising:
a memory comprising a mapping table; and
a control circuit configured to execute a flush process, wherein the flush process comprises:
mapping a group of data to multiple segments of the mapping table;
generating a recording table for recording a total value and multiple count values corresponding to the multiple segments;
when one of the data is written, increasing one of the multiple count values corresponding to one of the multiple segments of the one of the data by a number, and increasing the total value by another number;
determining whether the one of the multiple count values is greater than one of multiple optimized thresholds corresponding to the one of the multiple count values;
executing a flush operation to write the one of the multiple segments into the memory and restoring the mapping table if the one of the multiple count values is greater than the one of the multiple optimized thresholds; and
cleaning the recording table when the total value reaches a critical value, which allows the multiple count values, the total value and the multiple optimized thresholds to go to zero.

6. The SSD of claim 5, wherein the flush process executed by the control circuit further comprises: storing the recording table in the memory.

7. The SSD of claim 5, wherein one of the multiple optimized thresholds is determined by an equation of:

$$O = \frac{B}{\left(1 - \frac{C}{T}\right)} = \frac{B \times T}{(T - C)}$$

where O is defined as one of the multiple optimized thresholds, B is defined as one of multiple base thresholds corresponding to the multiple segments, C is defined as one of the multiple count values, and T is defined as the total value.

8. The SSD of claim 5, wherein the flush process executed by the control circuit further comprises: acquiring the recording table from the memory after the SSD is powered on.

* * * * *